(12) United States Patent
Ono

(10) Patent No.: US 10,377,365 B2
(45) Date of Patent: Aug. 13, 2019

(54) WORK VEHICLE

(71) Applicant: ISEKI & CO., LTD., Ehime-ken (JP)

(72) Inventor: Koki Ono, Ehime-ken (JP)

(73) Assignee: ISEKI & CO., LTD., Ehime-ken (JP)

( * ) Notice: Subject to any disclaimer, the term of this patent is extended or adjusted under 35 U.S.C. 154(b) by 102 days.

(21) Appl. No.: 15/811,167

(22) Filed: Nov. 13, 2017

(65) Prior Publication Data

US 2019/0143813 A1    May 16, 2019

(51) Int. Cl.

| B60W 10/02 | (2006.01) |
|---|---|
| B60W 10/06 | (2006.01) |
| B60W 10/18 | (2012.01) |
| F02D 41/04 | (2006.01) |

(52) U.S. Cl.
CPC ............ *B60W 10/18* (2013.01); *B60W 10/02* (2013.01); *B60W 10/06* (2013.01); *F02D 41/042* (2013.01); *B60W 2520/105* (2013.01)

(58) Field of Classification Search
CPC ...... B60W 10/02; B60W 10/06; B60W 10/18; B60W 10/184–192; B60W 2520/105
See application file for complete search history.

(56) References Cited

U.S. PATENT DOCUMENTS

| 2007/0004557 A1* | 1/2007 | Steen | B60T 8/1766 477/183 |
|---|---|---|---|
| 2015/0166065 A1* | 6/2015 | Kuroki | B60W 10/02 477/185 |

FOREIGN PATENT DOCUMENTS

| JP | 2006-333834 A | 12/2006 |
|---|---|---|
| JP | 2007099086 A | * 4/2007 |
| JP | 2017217945 A | * 12/2017 |

* cited by examiner

*Primary Examiner* — David R Morris
(74) *Attorney, Agent, or Firm* — Studebaker & Brackett PC

(57) ABSTRACT

According to one embodiment, a work vehicle includes: a traveling vehicle body; an engine supported by the traveling vehicle body; a power transmission device which transmits power of the engine to a wheel, and has a clutch member which is supported to be movable between a transmission position and a block position; a braking device which brakes the wheel; a brake control unit which allows the clutch member to move to the block position and the braking device to operate in a case where the traveling vehicle body is braked; a brake determination unit which determine whether the traveling vehicle body is braked in a case where the braking device is operated; and an engine control unit which stops the engine in a case where the traveling vehicle body is not braked on the basis of a determination result of the brake determination unit.

5 Claims, 11 Drawing Sheets

WORK VEHICLE

BACKGROUND

1. Field of the Invention

The present invention relates to a work vehicle which performs a work in a field and the like.

2. Description of the Related Art

As for a technology which brakes a work vehicle which performs a work in a field and the like, a technology described in JP-A-2006-333834 is known commonly, for example.

In JP-A-2006-333834, in a case where a combine moves by a preset distance or time, right and left brakes are operated at the same time to lock right and left crawlers and to stop the traveling automatically. In addition, JP-A-2006-333834 describes that an engine is stopped instead of the configuration of operating the right and left brakes, so as to stop the traveling of the combine. Accordingly, in JP-A-2006-333834, the combine travels in an unmanned manner on the step for moving to the cargo bed of the truck, and then is stopped automatically on the cargo bed of the truck.

However, in the technology in the related art, the configuration of operating right and left brakes is not in conjunction with the configuration of stopping the engine. That is, there is a problem that the engine cannot be stopped automatically in a case where a defect occurs in a brake mechanism such as a brake. Particularly, in the work vehicle which travels a field by autonomous control, a driving is performed in an unmanned manner in many cases, and the worker may not stop the engine and the like urgently. Therefore, in a case where the defect occurs in the brake mechanism, there is a risk that the work vehicle continuously travels, resulting in colliding with an obstacle such as a human or an animal (if exists) in a progressing direction.

SUMMARY

A technical object of the invention is to stop a traveling vehicle body safely although a defect occurs in a brake mechanism.

The above-described object of the invention is achieved by following configurations.

According to a first aspect of the present invention, there is provided a work vehicle including: a traveling vehicle body; an engine supported by the traveling vehicle body; a power transmission device which transmits power of the engine to a wheel, and has a clutch member which is supported to be movable between a transmission position of transmitting the power from the engine and a block position of blocking the transmission of the power from the engine; a braking device which brakes the wheel; a brake control unit which allows the clutch member to move to the block position and the braking device to operate in a case where the traveling vehicle body is braked; a brake determination unit which determine whether the traveling vehicle body is braked in a case where the braking device is operated; and an engine control unit which stops the engine in a case where the traveling vehicle body is not braked on the basis of a determination result of the brake determination unit.

According to a second aspect of the present invention, the work vehicle, according to the first aspect, may further includes an autonomous control unit which allows the traveling vehicle body to travel autonomously along a preset scheduled path, and the brake control unit may allow the clutch member to move to the block position and the braking device to operate in a case where the autonomous control unit brakes the traveling vehicle body.

According to a third aspect of the present invention, the work vehicle, according to the first aspect or the second aspect, may further includes: wheels on front and rear sides of the traveling vehicle body; a first transmission system which transmits the power of the engine to the rear wheel; and a second transmission system which transmits the power transmitted to the first transmission system to the front wheel, and the work vehicle may be provided with: the clutch member is provided which switches transmission and block of the power from the engine to the first transmission system; the power transmission device which is arranged between the first transmission system and the second transmission system and has a driving switch clutch member which is supported to be movable between a four-wheels driving position of transmitting the power from the first transmission system to the second transmission system and a two-wheels driving position of blocking the transmission of the power from the first transmission system to the second transmission system; the braking device which brakes the rear wheel; and the brake control unit which allows the clutch member to move to the block position and the driving switch clutch member to move to the four-wheels driving position in a case where the traveling vehicle body is braked.

According to a fourth aspect of the present invention, the work vehicle, according to any one of the first aspect to the third aspect, may further includes: a vehicle speed detection unit which detects a traveling speed of the traveling vehicle body on the basis of a rotation of the wheel braked by the braking device, and the brake control unit may be provided which allows the clutch member to move to a half-transmission position set between the transmission position and the block position in a case where the brake determination unit determines on the basis of the traveling speed that the wheel is stopped.

According to a fifth aspect of the present invention, in the work vehicle, according to the second aspect, the braking device may be operated while traveling is stopped.

With the invention according to the first aspect, in a case where it is determined that the traveling vehicle body is not braked even when the clutch member is moved to the block position to operate the braking device, the engine can be stopped. Accordingly, the traveling vehicle body can be stopped safely even when a defect occurs in the brake mechanism such as the clutch member or the braking device.

With the invention according to the second aspect, in a case where the traveling vehicle body is allowed to travel autonomously, the traveling vehicle body can also be stopped safely even when the defect occurs in the brake mechanism.

With the invention according to the third aspect, in a case where the braking device brakes the rear wheel, the front wheel can also be braked through the first transmission system and the second transmission system. Accordingly, the braking distance can be shortened easily compared to the case of the two-wheels driving.

With the invention according to the fourth aspect, in a case where the wheels are braked, the clutch member can also be moved to the half-transmission position. Accordingly, the power can be rapidly transmitted to the wheel at the time of restarting compared to a case where the clutch member is not moved to the half-transmission position. In addition, it can be suppressed that the traveling vehicle body moves by own weight conversely to the traveling direction compared to a case where the clutch member is not moved to the half-transmission position.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
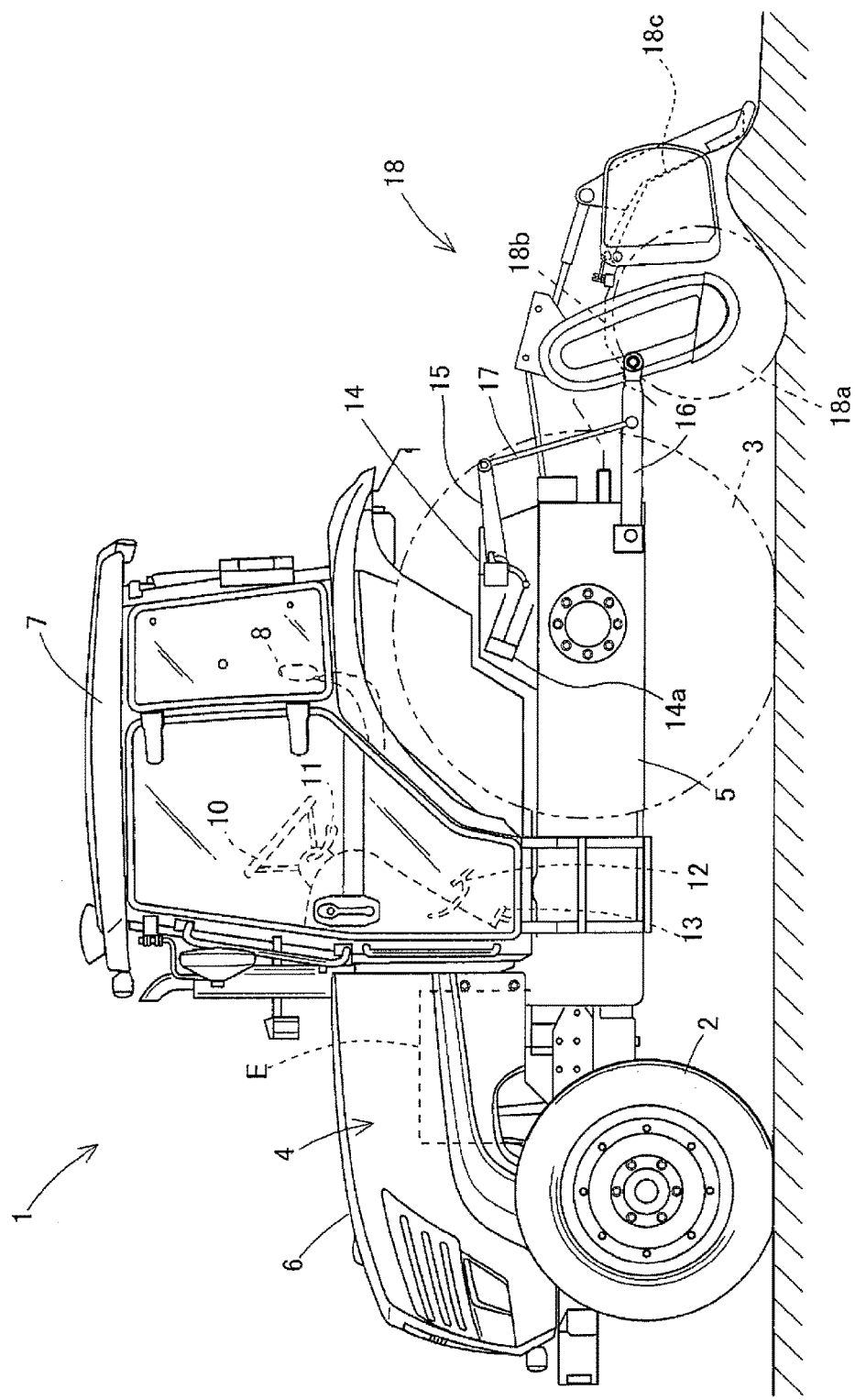
FIG. 1 is a side view of a work vehicle of an embodiment.

An embodiment of the invention will be described with the drawings. Incidentally, in the drawings, a member which is not necessary for the explanation of the invention is not illustrated or described properly. In addition, in this specification, right and left directions in an advancing direction of a work vehicle indicate a right side and a left side, respectively. The advancing direction indicates a front side, and a retreating direction indicates a rear side.

Work Vehicle

FIG. 1 is a side view of the work vehicle of the embodiment.

In FIG. 1, a tractor 1 of an agricultural machine as an example of the work vehicle includes front wheels 2 and 2 and rear wheels 3 and 3 in the front and rear parts of the traveling vehicle body. The tractor 1 is configured such that the rotational power of an engine E mounted in an engine room 4 of the traveling vehicle body front part is properly decelerated by a transmission in a transmission case 5 and is transmitted to the front wheels 2 and 2 and the rear wheels 3 and 3. The engine room 4 is configured to be covered with a bonnet 6. In addition, a work machine such as a rotary tilling device 18 is configured to be mounted in a machine body rear part and to drive a work machine in a PTO axis.

The upper part of the traveling vehicle body is supported by a cabin 7. In the cabin 7, a driver seat 8 is arranged in the upper position of the transmission case 5. A steering handle 10, a front and rear switching lever 11, a parking brake (not illustrated), a PTO gear shift lever (not illustrated) which changes a rotational speed of the work machine, and the like are arranged on the front side of the driver seat 8. In addition, a speed meter (not illustrated), various operation switches (not illustrated), and the like are arranged on the front side of the driver seat 8. Traveling operation tools such as a clutch pedal 12, an accelerator pedal 13, and right and left brake pedals (not illustrated) are arranged in the front lower portion of the driver seat 8.

In FIG. 1, a hydraulic cylinder case 14 is provided on the rear upper side of the transmission case 5, and lift arms 15 and 15 are pivoted rotatably on both of the right and left sides of the hydraulic cylinder case 14. Lift rods 17 and 17 are connected between the lift arms 15 and 15 and lower links 16 and 16, and the rotary tilling device 18 which is a work machine is connected to the rear portion of the lower links 16 and 16.

When a hydraulic operation lever (not illustrated) is operated to supply hydraulic oil to a hydraulic cylinder 14a contained in the hydraulic cylinder case 14, the lift arms 15 and 15 are rotated to the lifting side, and the work machine (rotary tilling device) 18 is lifted through the lift rods 17, the lower links 16, and the like. On the contrary, when the hydraulic operation lever (not illustrated) is operated to the lowering side, the hydraulic oil in the hydraulic cylinder 14a is discharged into the transmission case 5 which also serves as a hydraulic tank, and the lift arms 15 and 15 are lowered.

The rotary tilling device 18 is connected to the rear side of the traveling vehicle body of the tractor 1. The rotary tilling device 18 has a tilling part 18a, a main cover 18b which covers the upper side of the tilling part 18a, a rear cover 18c which is pivoted in the rear portion of the main cover 18b, and the like.

Figure 2:
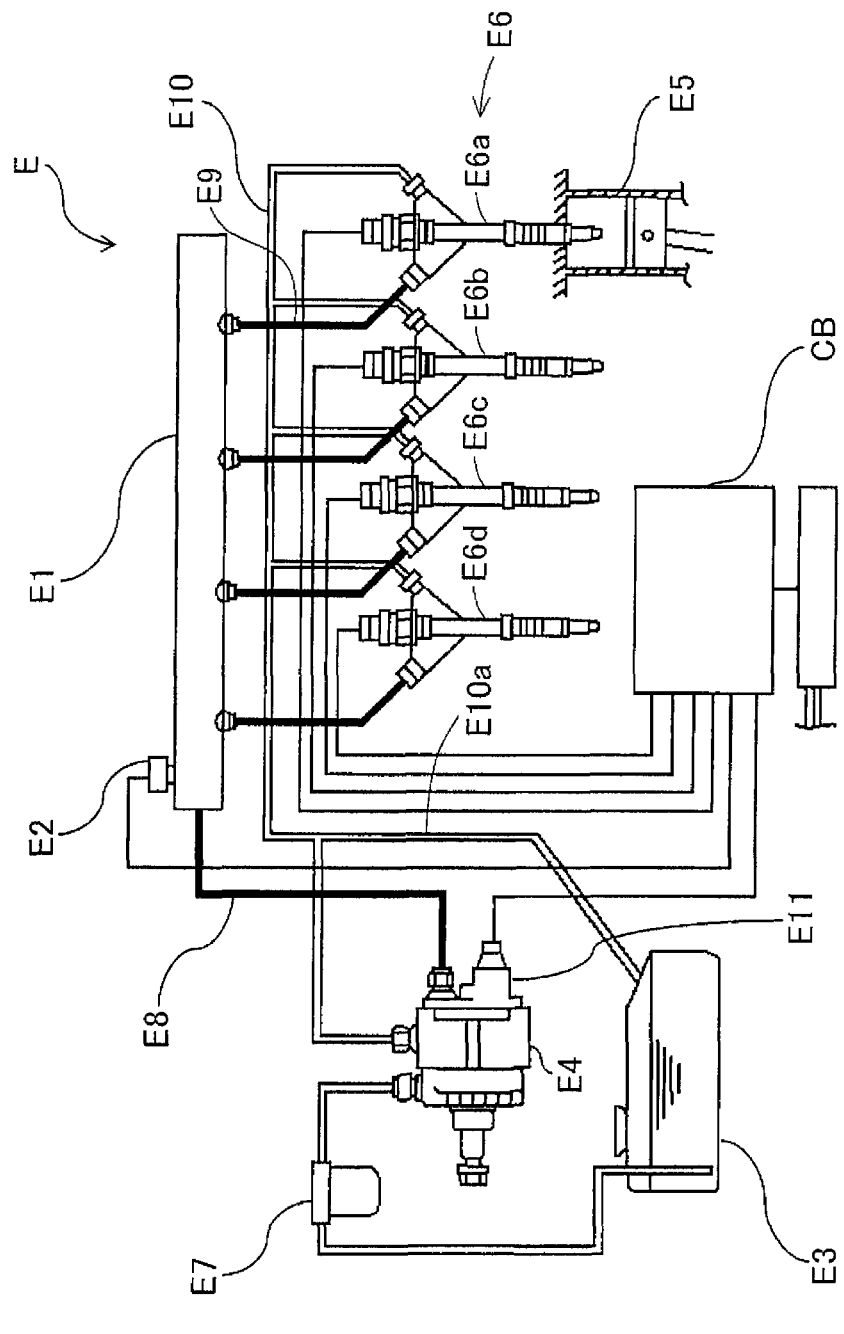
FIG. 2 is a view for illustrating an engine mounted in a tractor of the embodiment.

Engine FIG. 2 is a view for illustrating an engine mounted in the tractor of the embodiment.

In FIG. 2, an accumulation-type fuel injection device as one example of the engine E is applied to a multiple cylinder diesel engine, for example. However, the accumulation-type fuel injection device may be applied to a gasoline engine. Further, the accumulation-type fuel injection device is configured by a common rail E1 which accumulates an injection pressure for controlling the fuel properly, a rail pressure sensor E2 attached in the common rail E1, a fuel high-pressure pump E4 which pressurizes the fuel pumped up by a fuel tank E3 to force-feed to the common rail E1, a high pressure injector E6 which injects the high-pressure fuel accumulated in the common rail E1 into a cylinder E5 of the engine E, an engine control unit CB (ECU: Engine Control Unit) which controls the operation such as the control of the fuel high-pressure pump E4, the high-pressure injector E6, and the like.

As described above, in the common rail E1, the fuel which is injected into the cylinder E5 of the engine E is set to have the pressure necessary for the required output. The fuel in the fuel tank E3 is suctioned by a suction passage through a fuel filter E7 to the fuel high-pressure pump E4 driven in the engine E, and a high-pressure fuel pressurized by the fuel high-pressure pump E4 is guided to the common rail E1 through a discharge passage E8 and is accumulated.

The high-pressure fuel in the common rail E1 is supplied to the high-pressure injectors E6 (E6a, E6b, E6c, and E6d) corresponding to the number of cylinders through high-pressure fuel supplying passages E9, and the high pressure injector E6 is operated on the basis of the command from the engine control unit CB, so that the high-pressure fuel is injected and supplied into the cylinders E5 of the engine E. The excessive fuel (return fuel) in the high pressure injectors E6 is guided to a common return passage E10a through a return passage E10 and returns to the fuel tank E3 through the return passage E10a.

A pressure control valve E11 is provided in the fuel high-pressure pump E4 to control the fuel pressure (common rail pressure) in the common rail E1. The pressure control valve E11 adjusts an area of the flow path of the return passage E10a where the excessive fuel flows from the fuel high-pressure pump E4 to the fuel tank E3 according to the signal sent from the engine control unit CB. An amount of the fuel supplied to the common rail E1 side is adjusted according thereto to control the common rail pressure.

Specifically, a target common rail pressure is set according to the operating condition of the engine E, and the common rail pressure is feedback-controlled through the pressure control valve E11 such that the common rail pressure detected by the rail pressure sensor E2 matches the target common rail pressure.

Incidentally, when the high pressure injector E6 stops supplying fuel, the engine E is stopped.

Power Transmission Device

Figure 3:
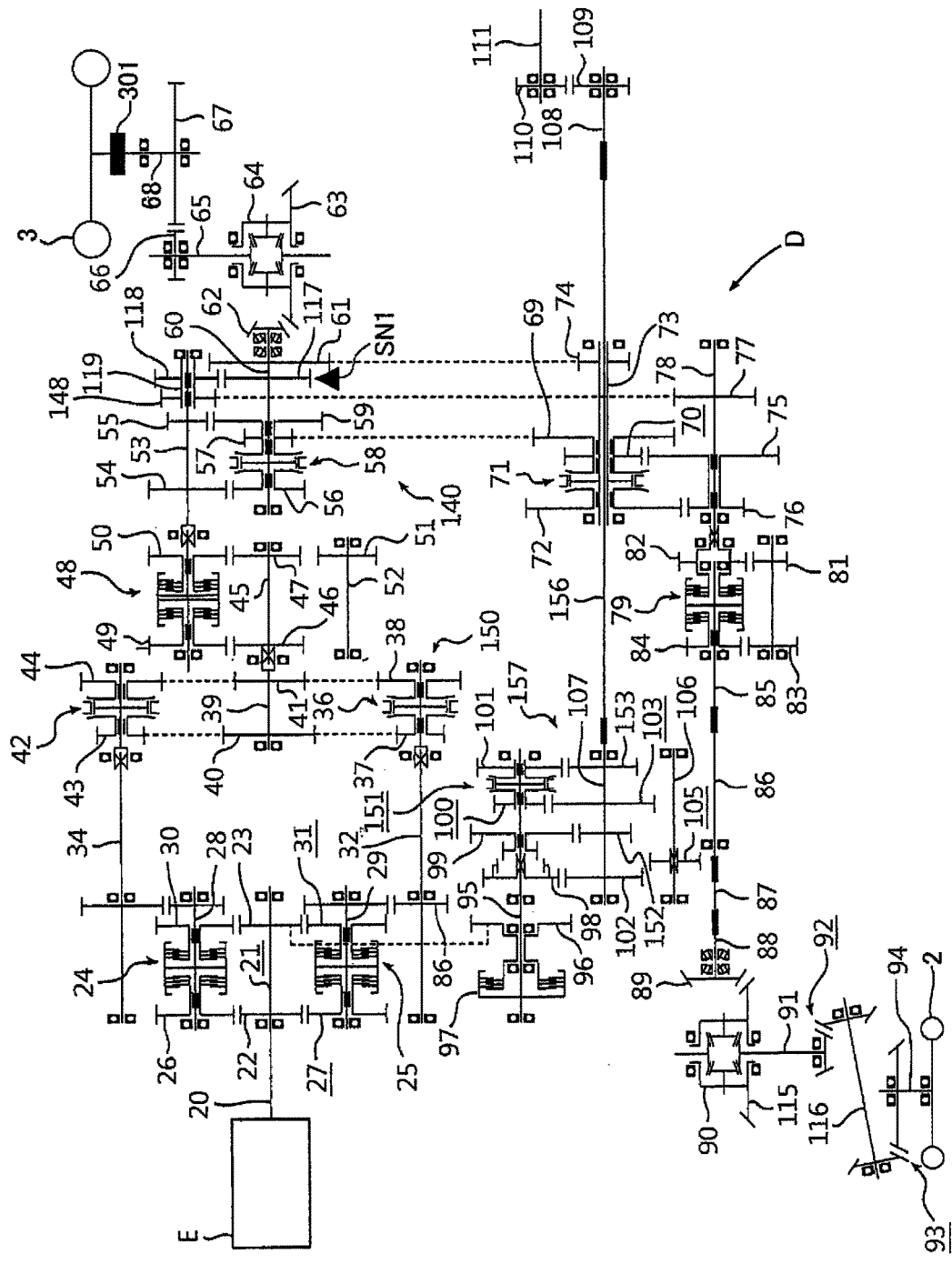
FIG. 3 is a view for illustrating a power transmission device of the embodiment.

FIG. 3 is a view for illustrating a power transmission device of the embodiment.

In FIG. 3, when the description is given about a power transmission device D in the transmission case 5, the rotation of an output shaft 20 of the engine E is transmitted to an input shaft 21, and a first output gear 22 and a second output gear 23 firmly fixed to the input shaft are rotationally driven by being engaged with a first low speed gear 26 of a first high and low clutch 24 and a second low speed gear 27 of a second high and low clutch 25, and a first high speed gear 30 of the first high and low clutch 24 and a second high speed gear 31 of the second high and low clutch 25, respectively.

The first high and low clutch 24 and the second high and low clutch 25 decelerate the rotation of the input shaft 21 by the same hydraulic multiple disk clutch to two high and low steps by the same decelerate ratio, respectively, so as to be transmitted to a first clutch shaft 28 and the second clutch shaft 29.

The rotation of a low-speed transmission shaft 34 and a high-speed transmission shaft 32 is transmitted to a first synchronizing change 42 and a second synchronizing change 36, respectively. A first synchronizing small gear 43 and a second synchronizing small gear 37 are engaged with a fifth gear 40 of a first transmission shaft 39, and a first synchronizing large gear 44 and a second synchronizing large gear 38 are engaged with a sixth gear 41 of the first transmission shaft 39 to transmit the rotation. Accordingly, the rotation of the first input shaft 21 is shifted to low-speed four steps and high-speed four steps by the first transmission shaft 39.

A main shifting part is configured by a multistage transmission 150. The shifting position of a main shifting lever (not illustrated) which an operator operates is read, and first and second high and low hydraulic multiple disk clutches 24 and 25 and first and second synchronizing changes 36 and 42 are controlled automatically by a traveling control unit CA to be shifted to the low-speed four steps and the high-speed four steps.

The first transmission shaft 39 is connected to a second transmission shaft 45. A seventh gear 46 and an eighth gear 47 are firmly fixed to the second transmission shaft 45 and are engaged with a normal rotation clutch gear 49 of a forward-reverse clutch (clutch member) 48 and a reverse rotation gear 51 of a reverse rotation shaft 52. A reverse rotation gear 51 is engaged with a reverse rotation clutch gear 50. Accordingly, when a forward-reverse clutch 48 is connected to the normal rotation clutch gear 49, the transmission is performed to an auxiliary gear shift shaft 53 connected to the forward-reverse clutch 48 in a normal rotation state. When the forward-reverse clutch 48 is connected to the reverse rotation clutch gear 50, the transmission is performed to the auxiliary gear shift shaft 53 in a reverse rotation state.

A ninth gear 54 and a tenth gear 55 are firmly fixed to the auxiliary gear shift shaft 53 and are engaged with a third synchronizing small gear 56 and a third synchronizing large gear 59 of a third synchronizing change 58, respectively. When the third synchronizing change 58 is connected to the third synchronizing small gear 56, a fifth transmission shaft 60 is accelerated by the rotation which is transmitted from the ninth gear 54 to the third synchronizing small gear 56, so as to be driven at a high speed. When the third synchronizing change 58 is connected to the third synchronizing large gear 59, the fifth transmission shaft 60 is decelerated by the rotation which is transmitted from the tenth gear 55 to the third synchronizing large gear 59, so as to be driven at a medium speed.

When the third synchronizing change 58 is set to be neutral, the rotation of the tenth gear 55 is transmitted to the third synchronizing large gear 59, and the transmission is performed from an eleventh gear 57 firmly fixed to the third synchronizing large gear 59 to a fourth synchronizing small gear 69.

When a fourth synchronizing change 71 is connected to the fourth synchronizing small gear 69, the rotation of the fourth synchronizing small gear 69 becomes in a low speed by a rotation of a sixteenth gear 74. When the fourth synchronizing change 71 is connected to a fourth synchronizing large gear 72, the rotation of the fourth synchronizing small gear 69 is transmitted from a fifteenth gear 70 to a seventeenth gear 75, an eighteenth gear 76, and the fourth synchronizing large gear 72 so that the sixteenth gear 74 becomes in a super low speed.

The sixteenth gear 74 is engaged with a twelfth gear 61 firmly fixed to the fifth transmission shaft 60 to drive the fifth transmission shaft 60. A first bevel gear 62 firmly fixed to the shaft end of the fifth transmission shaft 60 is engaged with a second bevel gear 63 of a rear bevel gear case 64, and rotates a rear wheel output shaft 68 from a bevel output shaft 65 of the rear bevel gear case 64 through a thirteenth gear 66 and a fourteenth gear 67, so as to drive the rear wheel 3.

A twenty-first gear 117 is firmly fixed to the fifth transmission shaft 60 and the rotation is transmitted to a nineteenth gear 77 of a first front wheel driving shaft 78 through a twenty-second gear 118 and a twenty-third gear 148 firmly fixed to a third cylinder shaft 119 pivotally supported in the auxiliary gear shift shaft 53, so that the rotation of the low-speed sixteen steps and the high-speed sixteen steps of the fifth transmission shaft 60 is transmitted to the first front wheel driving shaft 78.

The transmission is performed from first front wheel driving shaft 78 to a second front wheel driving shaft 85 through a front wheel acceleration clutch 79 and subsequently to a third front wheel driving shaft 86, a fourth front wheel driving shaft 87, and a front wheel driving bevel shaft 88. A first front bevel gear 89 firmly fixed to the shaft end of the front wheel driving bevel shaft 88 is engaged with a second front bevel gear 115 of a front bevel case 90, and the rotation transmitted to a front wheel output shaft 94 from a front bevel output shaft 91 of the front bevel case 90 through the first front bevel gear 92, a front wheel driving shaft 116, and a second bevel gear assembly 93 causes the front wheel output shaft 94 to rotate, thereby driving the front wheel 2.

When the front wheel acceleration clutch (driving switch clutch member) 79 is connected to a front wheel constant speed gear 82 side, the rotational driving of the first front wheel driving shaft 78 is transmitted to the second front wheel driving shaft 85 as it is, so as to be a normal four-wheels driving. When the front wheel acceleration clutch 79 is connected to a front wheel acceleration gear 84 side, the rotation in which the rotational driving of the first front wheel driving shaft 78 is accelerated from the front wheel constant speed gear 82 through a first acceleration gear 81 and a second acceleration gear 83 is transmitted to the second front wheel driving shaft 85, so as to be a front wheel acceleration four-wheels driving. Further, when the front wheel acceleration clutch 79 is set to be in a neutral state, the power is not transmitted to the front wheel 2, so as to be a rear two-wheels driving.

A main clutch gear 96 of a PTO main clutch 97 is engaged with the second output gear 23, and the power interruption to a PTO output shaft 111 is performed by the PTO main clutch 97.

A first PTO axis 95 is provided with a PTO shifting part 157, and is mounted with a first PTO gear 98, a second PTO gear 99, a fifth synchronizing small gear 100 and a fifth synchronizing large gear 101 of a fifth synchronizing change 151. A twentieth gear 102, a twenty-fourth gear 152, a twenty-sixth gear 103, and a twenty-fifth gear 153 are firmly fixed to the second PTO axis 107, and the PTO reverse rotation gear 105 is pivotally supported in a counter shaft 106.

When the first PTO gear 98 is slid to be engaged with the twentieth gear 102, the second PTO axis 107 becomes in a second speed. When the first PTO gear 98 is slid to be engaged with the second PTO gear 99, the rotation of the first PTO axis 95 is transmitted to the second PTO axis 107 through the second PTO gear 99 and the twenty-fourth gear 152 to become a fourth speed. When the fifth synchronizing change 151 is connected to the fifth synchronizing small gear 100, the rotation is transmitted from the fifth synchronizing small gear 100 to the twenty-sixth gear 103 to become a first speed. When the fifth synchronizing change 151 is connected to the fifth synchronizing large gear 101, the rotation is transmitted from the fifth synchronizing large gear 101 to the twenty-fifth gear 153 to become a third speed. When the PTO reverse rotation gear 105 is engaged with the first PTO gear 98 and the twentieth gear 102, the rotation of the first PTO axis 95 is transmitted to the twentieth gear 102 from the first PTO gear 98 through the PTO reverse rotation gear 105 and is transmitted to the second PTO axis 107 to be rotated reversely.

The rotation of the second PTO axis 107 is transmitted to the fourth PTO axis 108 through the third PTO axis 156, and further is decelerated by the first PTO output gear 109 and the second PTO output gear 110, so as to drive the PTO output shaft 111.

Clutch Member

Figure 4:
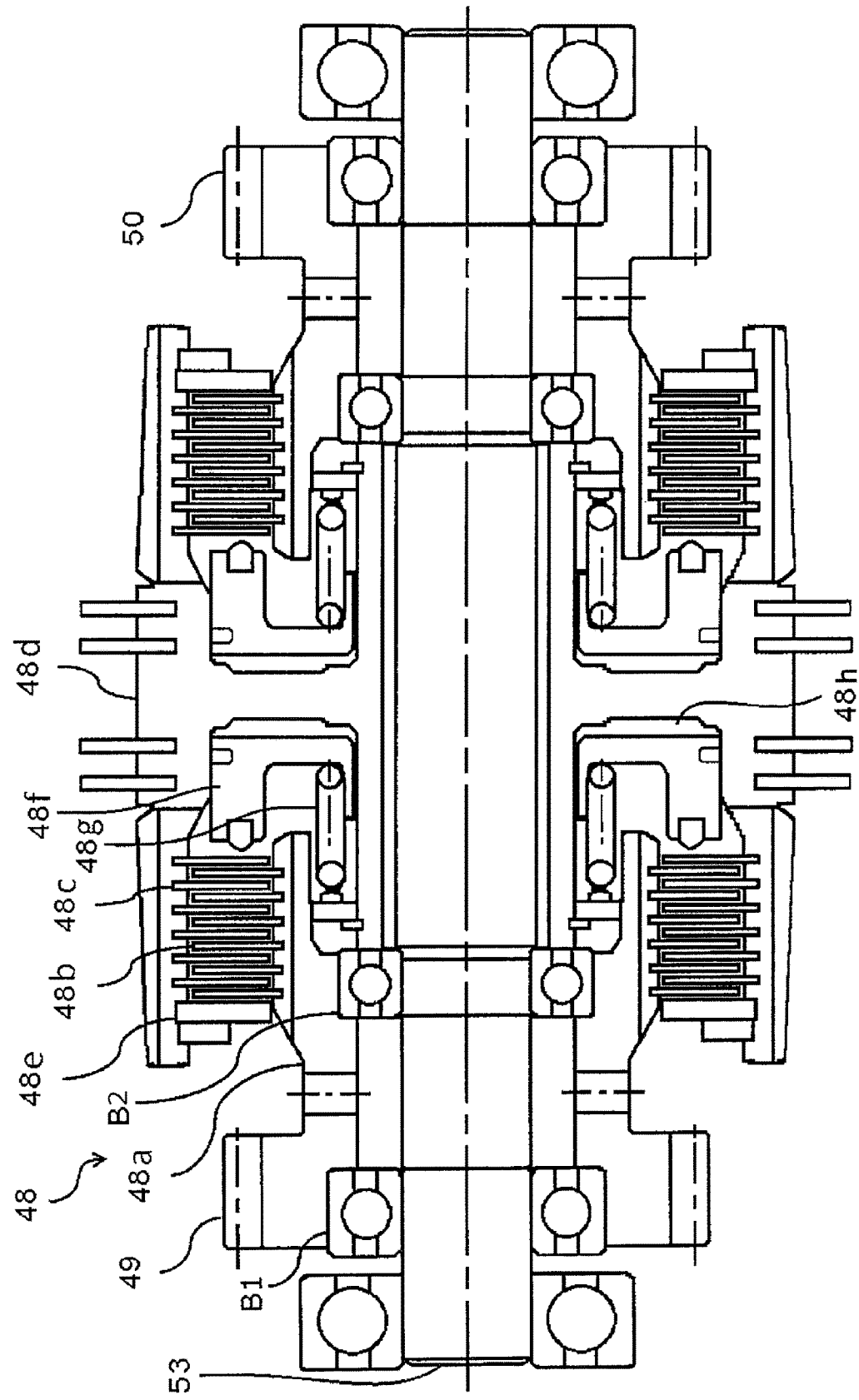
FIG. 4 is a sectional view of a forward-reverse clutch of the embodiment.

FIG. 4 is a sectional view of the forward-reverse clutch of the embodiment.

In FIG. 4, in the forward-reverse clutch (clutch member) 48, a clutch shaft 48a integrated with a normal rotation clutch gear 49 is rotatably supported in the auxiliary gear shift shaft 53 by a second bearing B1 and a third bearing B2, and a plurality of inside clutch plates 48b are provided in the rear portion. The rear portion of the clutch shaft 48a is covered with a clutch case 48d, and a pressing plate 48e fixed inside the front portion of the clutch case 48d is positioned on the front side of the front end of the plurality of inside clutch plates 48b.

On the inside of the inner portion of the clutch case 48d, a plurality of outside clutch plates 48c are arranged alternately to be interposed between the inside clutch plates 48b. The inside clutch plate 48b has a plurality of teeth on the inside and is rotated integrally with the clutch shaft 48a, and the outside clutch plate 48c has a plurality of teeth on the outside and is rotated integrally with the clutch case 48d.

A clutch piston 48f is provided in the rear portion of the clutch shaft 48a inside the clutch case 48d, and is biased to the rear side by a spring 48g. The rear portion of the clutch piston 48f is a space of the cylinder part 48h in which pressure oil is supplied. In the forward-reverse clutch 48, the pressure oil is supplied to the cylinder part 48h. When the pressure exceeds the elastic force of the spring 48g, the clutch piston 48f advances to hold the inside clutch plate 48b and the outside clutch plate 48c together with the pressing plate 48e (that is, the forward-reverse clutch 48 moves to a transmitting position in which the power from the engine E is transmitted.). The held inside clutch plate 48b and the outside clutch plate 48c transmit a driving force to each other through a friction, and the driving force transmitted from the normal rotation clutch gear 49 is transmitted to the clutch case 48d, so as to rotate the auxiliary gear shift shaft 53 spline-fitted in the clutch case 48d.

In a state where the pressure oil is not supplied to the cylinder part 48h so that the pressure is not applied, the clutch piston 48f is pressed to the rear side by the elastic force of the spring 48g, and thus the inside clutch plate 48b and the outside clutch plate 48c are not held (that is, the forward-reverse clutch 48 moves to a block position to block the transmission of the power from the engine E.). In this state, the inside clutch plate 48b and the outside clutch plate 48c do not transmit the driving force to each other, and thus the forward-reverse clutch 48 becomes in the state of blocking the power transmission. Although the normal rotation clutch gear 49 rotates, the auxiliary gear shift shaft 53 is not rotated.

The reverse rotation clutch gear 50 is provided on the opposite side to the normal rotation clutch gear 49 with the clutch case 48d interposed therebetween, and the transmission and the block of the retreat-side power are performed with the same configuration.

The first high and low clutch 24, the second high and low clutch 25, and the front wheel acceleration clutch 79 are used to have the same configuration. The PTO main clutch 97 is used to have one side half configuration.

Braking Device

In FIG. 3, a braking device 301 is arranged in the rear wheel output shaft 68 supported by the rear wheel 3. The braking device 301 is configured as a so-called disk brake. By the expansion and contract of a brake cylinder (to be described), the braking device 301 brakes the rear wheel output shaft 68 and brakes the rear wheel 3 in the brake pressure in response to the expansion and contract. In addition, the braking device 301 is connected also to the brake pedal (not illustrated) and brakes the rear wheel 3 in the brake pressure in response to the step-on amount of the brake pedal. Incidentally, in FIG. 3, although not illustrated, a pair of right and left bevel output shafts 65 and 65 extend from the rear bevel gear case 64 to correspond to both right and left wheels 3 and 3, and members having reference numerals 66 to 68 are arranged as a pair of right and left ones. That is, the pair of right and left rear wheels 3 and 3 are braked by respective braking devices 301 and 301. Incidentally, the configuration is known commonly which operates the braking device 301 with the brake pedal or the brake cylinder, and for example, the configuration described in JP 2004-114965 A can be applied. Thus, the detailed description will not be given.

Hydraulic Circuit

Figure 5:
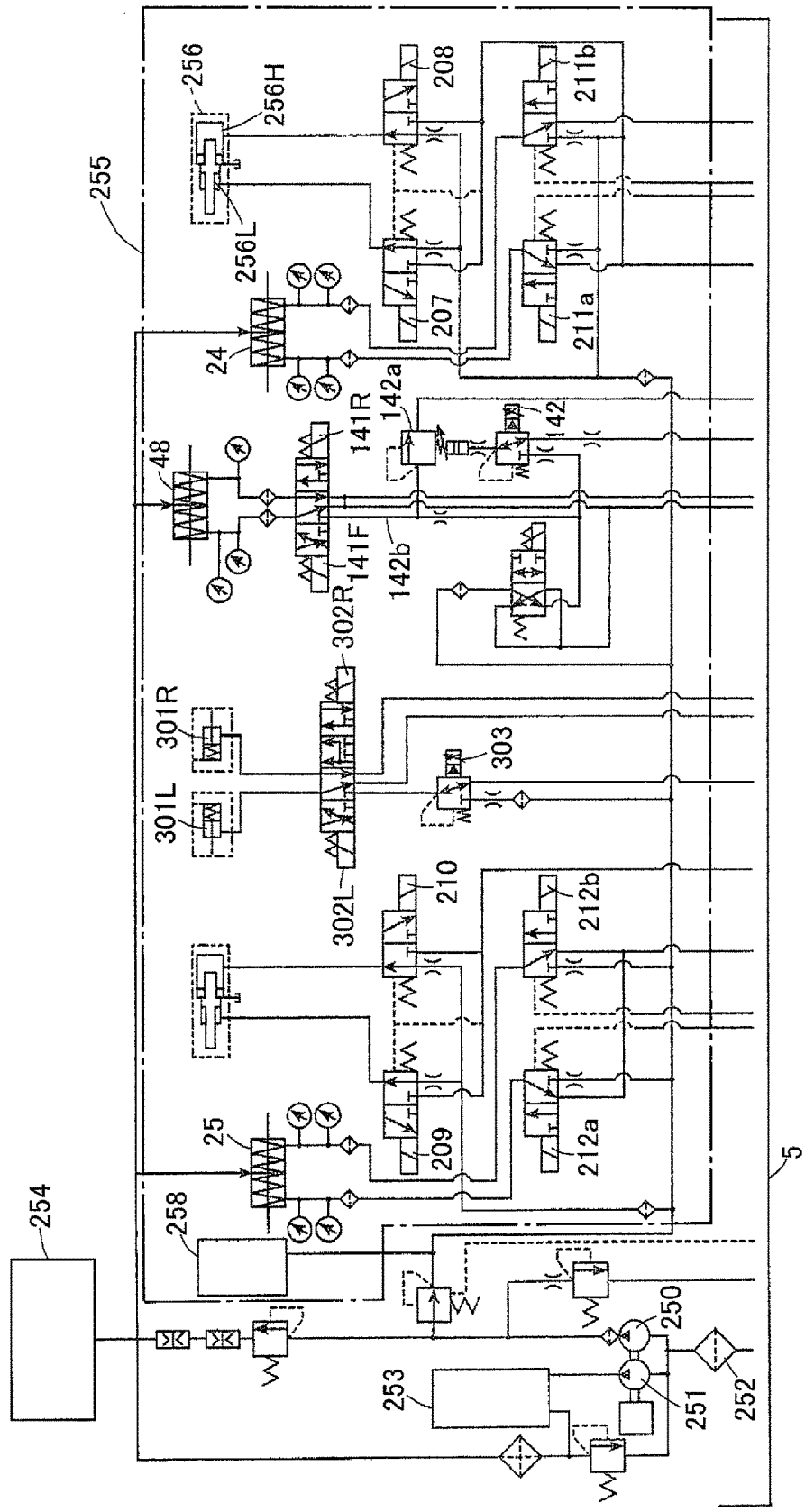
FIG. 5 is a view for illustrating of a hydraulic circuit of the tractor of the embodiment.

FIG. 5 is a view for illustrating a hydraulic circuit of the tractor of the embodiment.

In FIG. 5, a main pump 250 and a sub pump 251 which are operated by the engine power suck lubricating oil in the transmission case 5 through a suction filter 252 and supply the pressure oil into the hydraulic circuit as hydraulic oil. From the sub pump 251, the pressure oil is supplied to a power steering device 253 to operate the front wheel 2. The hydraulic oil discharged from the power steering device 253 is used as a lubricating/cooling oil of the first high and low clutch 24, the second high and low clutch 25, and the forward-reverse clutch 48, and returns into the transmission case 5.

From the main pump 250, the pressure oil is supplied to a work machine system hydraulic device 254 and a traveling system hydraulic device 255. In the traveling system hydraulic device 255, when the main shifting lever (not illustrated) is operated in the first speed, a current flows to a first main shifting first solenoid 207 to move the valve, and the pressure oil escapes from a Lo oil chamber 256L of a first main shifting cylinder 256 so that the first synchronizing change 42 is connected to the first synchronizing small gear 43 side. Further, the current flows to a first Lo solenoid 211a to move the valve, and the pressure oil is supplied to the oil chamber of the first high and low clutch 24 on the low-speed side and the first synchronizing change 42 is connected to the first low speed gear 26 side.

When the main shifting lever (not illustrated) is operated from the first speed to the second speed, the state of the first main shifting first solenoid 207 is not changed. In a state where the first synchronizing change 42 is connected to the first synchronizing small gear 43 side, the current of the first Lo solenoid 211a stops, and the current flows to a first Hi solenoid 211b to move respective valves. The pressure oil is supplied to the oil chamber of the first high and low clutch 24 on the high-speed side and the first synchronizing change 42 is connected to the first high speed gear 30 side.

When the main shifting lever (not illustrated) is operated from the second speed to the third speed, the current of the first main shifting first solenoid 207 stops, and the current flows to a second main shifting first solenoid 209. The connection of the first synchronizing change 42 is cut, and the second synchronizing change 36 is connected to the second synchronizing small gear 37 side. Further, the current of the first Hi solenoid 211b stops, and the current flows to a second Lo solenoid 212a to move respective valves. The pressure oil is supplied to the oil chamber of the second high and low clutch 25 on the low-speed side and the second synchronizing change 36 is connected to the second low speed gear 27 side.

Hereinafter, similarly, the second synchronizing small gear 37 is connected to the second high speed gear 31 in the fourth speed, the first synchronizing large gear 44 is connected to the first low speed gear 26 in the fifth speed, the first synchronizing large gear 44 is connected to the first high speed gear 30 in the sixth speed, the second synchronizing large gear 38 is connected to the second low speed gear 27 in the seventh speed, and the second synchronizing large gear 38 is connected to the second high speed gear 31 in the eighth speed, so as to perform a main shifting operation.

At the time of the shifting or the starting of a vehicle, the connection pressure of the advancing and retreating clutch 48 is adjusted to suppress a shifting shock or a shock during starting. When the advancing and retreating lever 11 is operated to advance or retreat, an advancing and retreating lever sensor SN12 reads the operation position of the advancing and retreating lever 11, and the current flows to an advance switching solenoid 141F or a retreat switching solenoid 141R, so that the valve is moved to select the oil path. When the flow rate which determines the relief pressure of an advancing and retreating relief valve 142a is adjusted by the magnitude of the current which flows to an advancing and retreating boosting solenoid 142 as a proportional solenoid, the pressure of an advancing and retreating oil passage 142b can be adjusted to an arbitrary pressure.

In the traveling system hydraulic device 255, when the current flows to a left brake solenoid 302L, the valve is moved to supply the pressure oil to a left brake cylinder 301L. Accordingly, the left braking device 301 is operated. At that time, the magnitude of the current flowing to a brake pressure solenoid 303 as a proportional solenoid is changed to adjust the hydraulic pressure to the left brake cylinder 301L. Accordingly, the expansion and contract of the left brake cylinder 301L is adjusted to change the brake pressure of the left braking device 301. The right braking device 301 is the same as the left braking device 301 except that the current flows to a right brake solenoid 302R to supply the pressure oil to the right brake cylinder 301R. Incidentally, when the current flows to both right and left solenoids 302L and 302R, the pressure oil is supplied to the right and left brake cylinders 301L and 301R to operate the right and left braking devices 301 and 301. That is, the right and left rear wheels 3 and 3 are braked.

Figure 6:
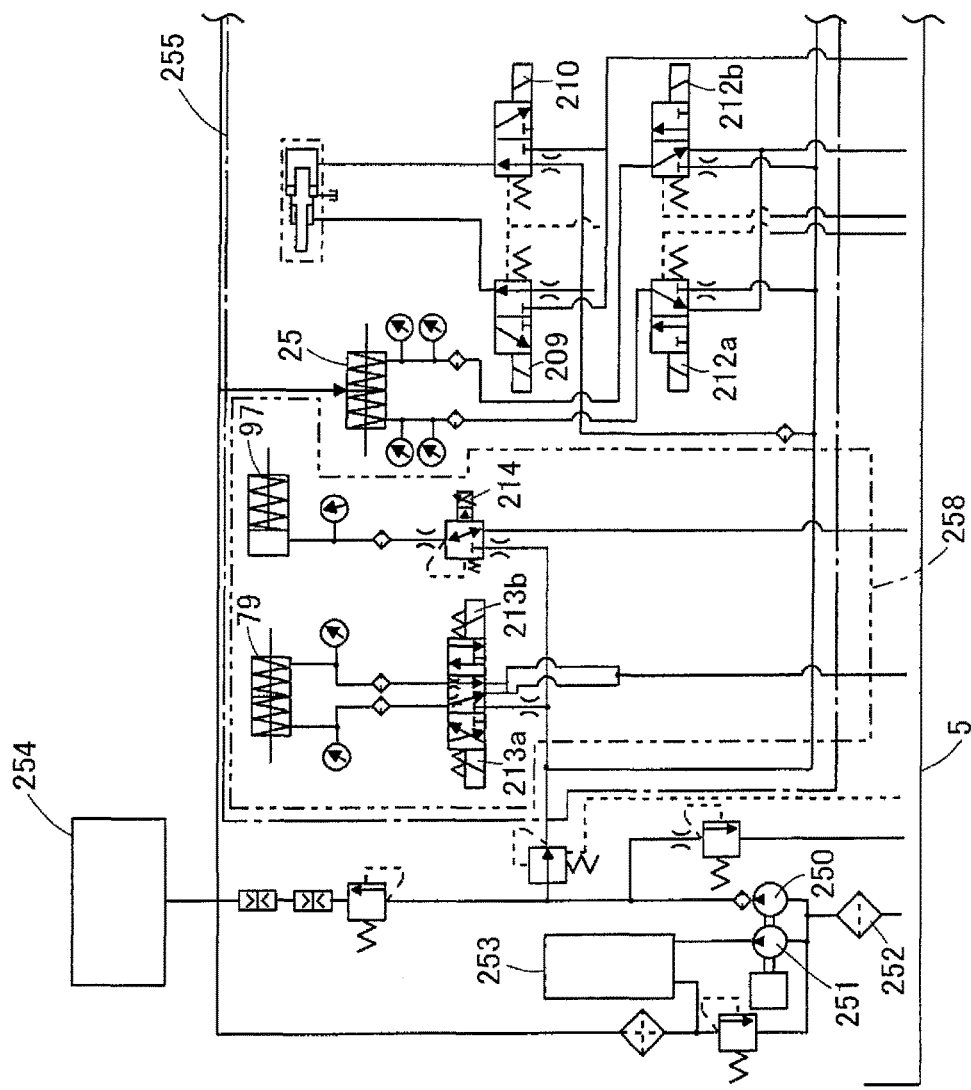
FIG. 6 is a view for illustrating a main portion of FIG. 5.

FIG. 6 is a view for illustrating the main portion of FIG. 5.

In FIG. 6, in a device portion 258 of the traveling system hydraulic device 255, in response to the operation position of the drive switching lever (not illustrated), the current flows to a 4WD solenoid 213a or a front wheel acceleration solenoid 213b to move the valve and select the oil path, and the pressure oil is supplied to the oil chamber of the front wheel acceleration clutch 79. That is, in a case where the current flows to the 4WD solenoid 213a, and the current flowing to the front wheel acceleration solenoid 213b is stopped, the front wheel acceleration clutch 79 moves to a position of being connected to the front wheel constant speed gear 82 side (a four-wheel driving position of the embodiment). In addition, in a case where the current flowing to the 4WD solenoid 213a is stopped, and the current flows to the front wheel acceleration solenoid 213b, the front wheel acceleration clutch 79 moves to a position on the front wheel acceleration gear 84 side. Further, in a case where the current flowing to the both solenoids 213a and 213b is stopped, the front wheel acceleration clutch 79 moves to the two-wheel driving position.

In the device portion 258, in a case where a PTO on/off switch SW1 is turned on, the current flows to a PTO clutch solenoid 214, and the pressure oil is supplied to the cylinder part of the PTO main clutch 97. At that time, the PTO main clutch 97 moves to a position of being engaged with the main clutch gear 96, and the power is transmitted to the PTO output shaft 111.

Incidentally, in FIG. 3, the synchronizing changes 58, 71, and 151 are linked mechanically in an auxiliary shifting lever (not illustrated) and the PTO gear shift lever, and are directly operated in a manual manner without the hydraulic device before the work starts. In addition, the commonly-known configuration can be applied to the work machine system hydraulic device 254, and the detailed description is not given.

Management System of Work Vehicle

Figure 7:
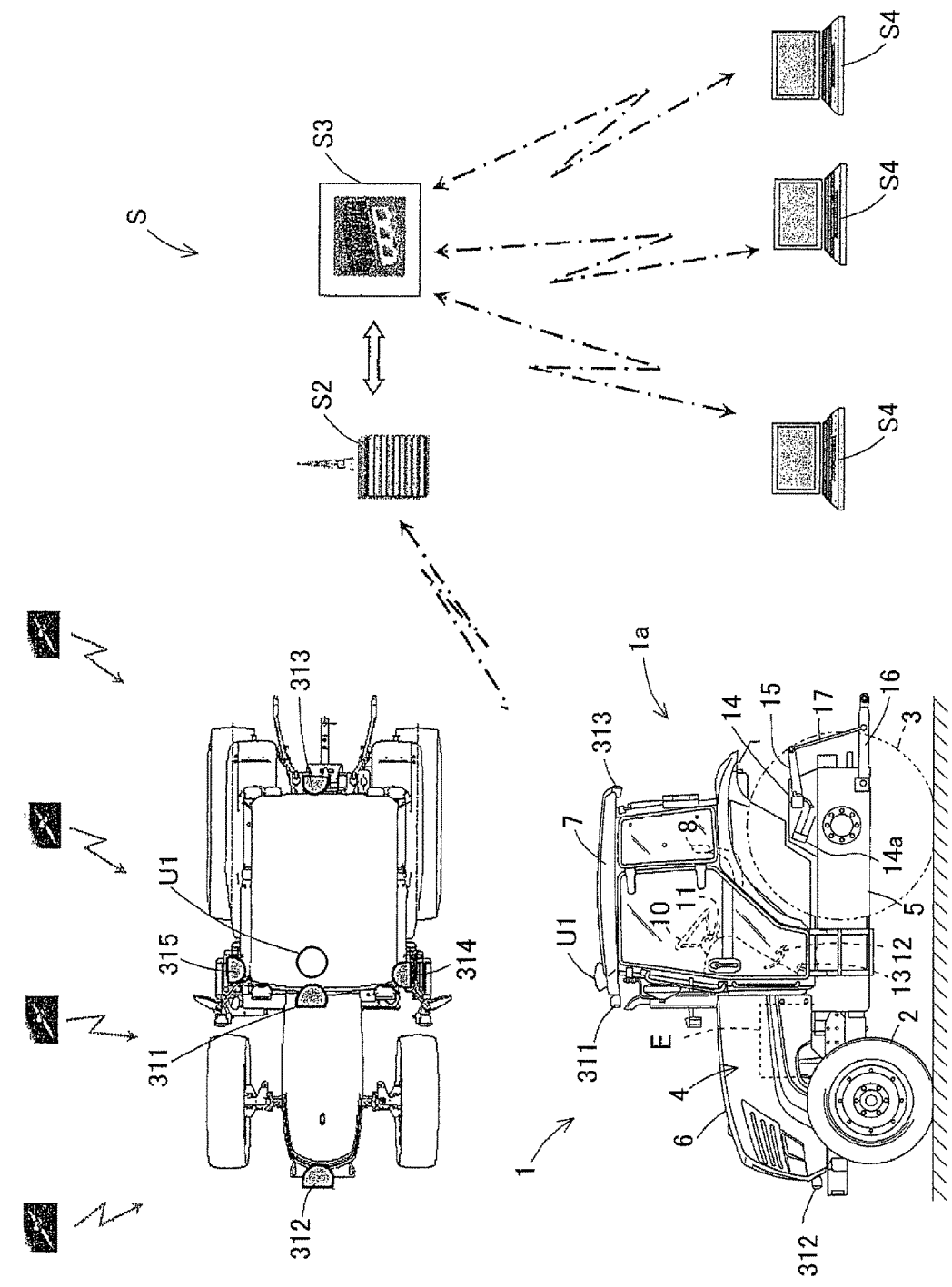
FIG. 7 is a view for illustrating the entire management system of the work vehicle.

FIG. 7 is a view for illustrating the entire management system of the work vehicle. In FIG. 7, a management system S of the work vehicle has the tractor 1. A communication unit U1 in which a GPS antenna is built is mounted in the roof upper surface of the cabin 7 of the tractor 1. In addition, in the center portion of the tractor 1 in a vehicle width direction, a front camera 311 is supported in the front portion of the cabin 7. In addition, a second front camera 312 is supported in the front portion of the bonnet 6. Further, a rear camera 313 is supported in the rear portion of the cabin 7. In addition, a left camera 314 is supported on the left side of the cabin 7. Further, a right camera 315 is supported on the right side of the cabin 7. The cameras 311 to 315 are supported by a supporting part which can control and adjust the direction of the cameras.

In the management system S of the work vehicle, through the communication unit U1, the tractor 1 can perform a radio communication with a base station S2, and the base station S2 can communicate with a server S3 which is managed by a service manager in charge of a manufacturing maker and the like of the tractor 1. Further, a weather information terminal (not illustrated) provided in the field and the like is configured to be capable of being communicating with the soil information terminal (not illustrated), and weather and soil information such as a temperature, a humidity, solar radiation amount, soil content, soil moisture content, and soil hardness can be obtained in a management system S of the work vehicle. In addition, the server S3 is configured to be capable of communicating with a terminal S4 which is a user of the tractor 1, a business office of the manufacturing maker of the tractor, or the like. The management system S of the work vehicle of this embodiment is configured by the tractor 1, the base station S2, the server S3, the terminal S4, a tablet terminal TAB, and the like.

In the management system S of the work vehicle, vehicle management information, vehicle driving information, work machine basic operation information are stored as basic information of a vehicle in the tractor 1. For example, the vehicle management information includes a model, a type, a vehicle particular number such as a serial number, a running time which is vehicle hour meter information, and position information provided by a GPS. In addition, the vehicle driving information includes an engine oil pressure, an engine cooling water temperature, an instantaneous fuel consumption, a remaining fuel amount, 3P position information, a traveling shifting position, vehicle speed information, a PTO speed, an engine speed, and the like. Further, the work machine basic driving information includes a model, a type, and a vehicle particular number such as a serial number, an agricultural chemical spray amount (spray amount per unit area), an agricultural chemical tank remaining amount, spray width information, yield information, and the like.

The management system S of the work vehicle collects information obtained from the tractor 1 to perform analysis and processing on data, so as to obtain the same kind of information as an automobile and a construction machine, the specific information of the agricultural machine, specific agricultural information, and the like. Herein, the same kind of information as the automobile and the construction machine indicates vehicle driving information, the collection of running time, the collection of fuel consumption, fault information, and the like. In addition, the specific information of the agricultural machine indicates running information of each of the work machines, work machine consumer goods information, work driving path information, vehicle speed information of each of the work machine, and the like. Further, the specific agricultural information indicates the weather information of each of the fields, the soil information of each of the fields, and the like.

The same kind of information as the automobile and the construction machine, maintenance period guidance, information such as economic driving recommendation guidance for saving the fuel consumption can be provided through the analysis and the processing of the data. The same kind of information as the automobile and the construction machine indicates accident occurrence information, theft tracking information, and the like. The maintenance period guidance indicates the prompt response of failure correction, consumable part time guidance, and the like. The economic driving recommendation guidance for saving the fuel consumption indicates the weather information of each of the fields, the soil information of each of the fields, and the like.

Description of Functional Block Diagram

Figure 8:
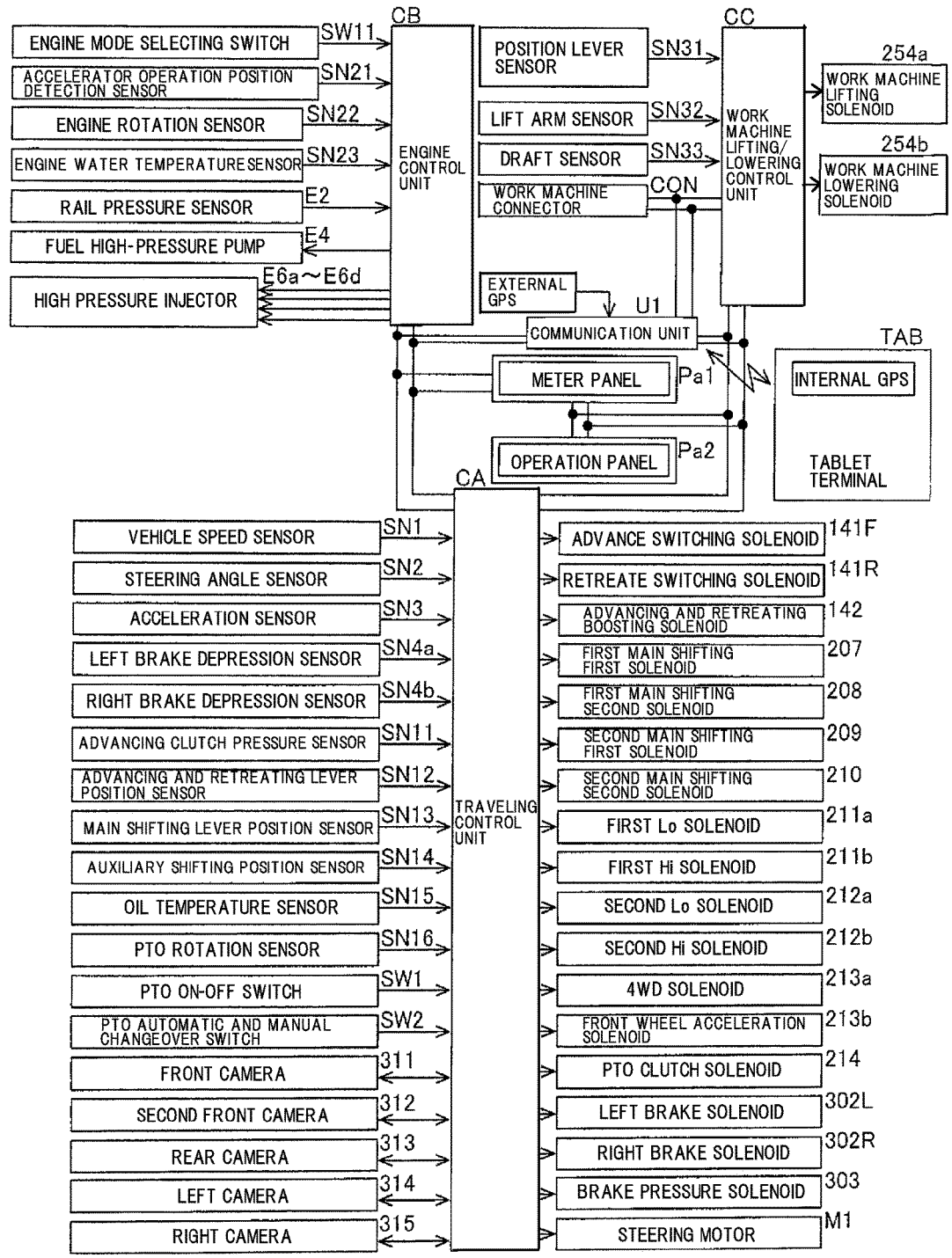
FIG. 8 is a functional block diagram of the management system of the work vehicle of the embodiment.

FIG. 8 is a functional block diagram of the management system of the work vehicle of this embodiment.

In FIG. 8, the management system S of the work vehicle of the first embodiment has control units CA to CC of the tractor, a terminal control unit CD of the tablet terminal, a control unit (not illustrated) of the server S3 or the terminal S4, and the like. The control units CA to CD are configured by an input/output interface (I/O) which performs the input and output of the signal with the outer part, a ROM (read-only memory) storing a program, information, and the like for performing a necessary process, a RAM (random access memory) for storing the necessary data temporally, a CPU (central processing unit) which performing the processing in response to the program stored in the ROM and the like, a compact information processor (so-called microcomputer) having an oscillator and the like. Various functions can be implemented by executing a program stored in the ROM or the RAM, and a memory member such as a nonvolatile memory.

Control Unit of Tractor

The control units CA to CC of the tractor are configured by a so-called ECU (Electronic Control Unit). The control units CA to CC are connected to a CAN (Controller Area Network) as a communication line and are configured to be accessible to each other. In addition, the CAN is connected to the communication unit U1 which communicates with the outer part by receiving positioning information of the GPS, or a meter panel Pa1 and an operation panel Pa2 of the tractor 1, and sends and receives the communication information or the operation information to and from the control units CA to CC.

Traveling Control Unit CA

In the traveling control unit CA, an output signal is input from signal output elements such as a vehicle speed sensor SN1, a steering angle sensor SN2, an acceleration sensor SN3, right and left brake depression sensors SN4a and SN4b, an advancing clutch pressure sensor SN11, an advancing and retreating lever position sensor SN12, a main shifting lever position sensor SN13, an auxiliary shifting position sensor SN14, an oil temperature sensor SN15, a PTO rotation sensor SN16, the PTO on-off switch SW1, a PTO automatic and manual changeover switch SW2, and cameras 311 to 315.

Herein, in this embodiment, the vehicle speed sensor SN1, which is one example of the brake detection member, as one example of a vehicle speed detection member detects a traveling speed V of the tractor 1 on the basis of the rotation of the rear wheel 3 as one example of the wheel. In FIG. 3, the vehicle speed sensor SN1 of this embodiment is arranged to correspond to the arranged position of the twenty-first gear 117, and the passing number of the tooth of the gear which passes the detection position during a unit time is measured to detect the traveling speed V. Incidentally, the arranged position of the vehicle speed sensor SN1 is not limited thereto. The vehicle speed sensor SN1 can be arranged to correspond to the gear arranged between the third synchronizing change 58 and the rear wheel 3, and for example, the vehicle speed sensor SN1 is arranged to correspond to the arranged position of the twenty-second gear 118 instead of the twenty-first gear 117.

The acceleration sensor SN3, which is one example of the acceleration detection member, as one example of an acceleration detection member detects a traveling acceleration A of the tractor 1. In this embodiment, the traveling acceleration A which has the front side of the tractor 1 as a positive is detected. Accordingly, in a case where the negative traveling acceleration A is detected by the acceleration sensor SN3, it is detected that the tractor 1 is decelerated.

The traveling control unit CA is connected to a steering motor M1, the advance switching solenoid 141F, the retreat switching solenoid 141R, the advancing and retreating boosting solenoid 142, the first main shifting first solenoid 207, a first main shifting second solenoid 208, a second main shifting first solenoid 209, a second main shifting second solenoid 210, the first Lo solenoid 211a, the first Hi solenoid 211b, the second Lo solenoid 212a, a second Hi solenoid 212b, the 4WD solenoid 213a, the front wheel acceleration solenoid 213b, the PTO clutch solenoid 214, the left brake solenoid 302L, the right brake solenoid 302R, the brake pressure solenoid 303, and another control element (not illustrated).

Figure 9:
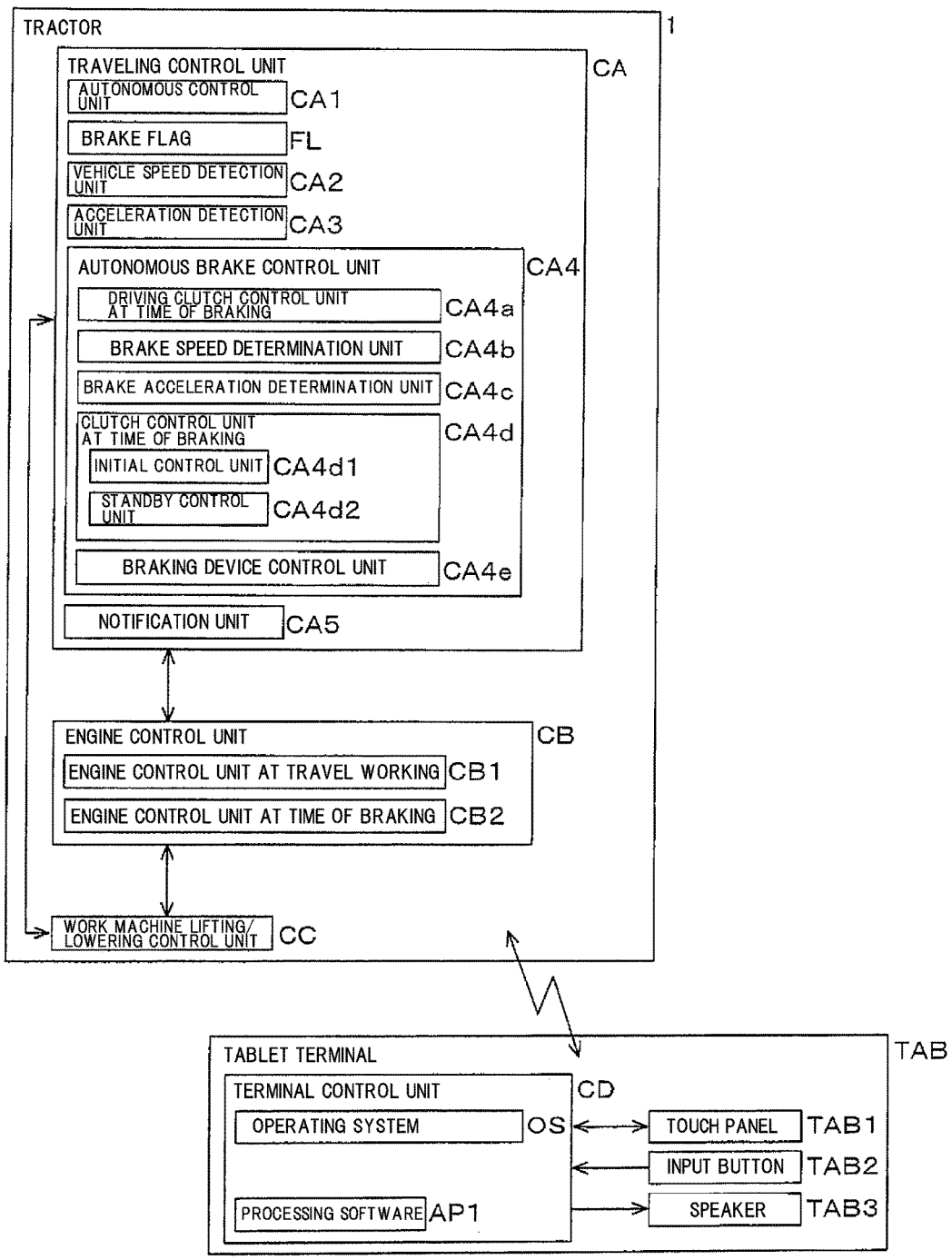
FIG. 9 is a view for illustrating a main portion of FIG. 8, and is a view for illustrating control units.

FIG. 9 is a view for illustrating main portions of FIG. 8, and is a view for illustrating the control units.

In FIG. 9, the traveling control unit CA has a function to execute the process in response to the output signal from the signal output element and the like to output the control signal to the control element and the like. That is, the control unit CA has a following function unit.

Figure 10:
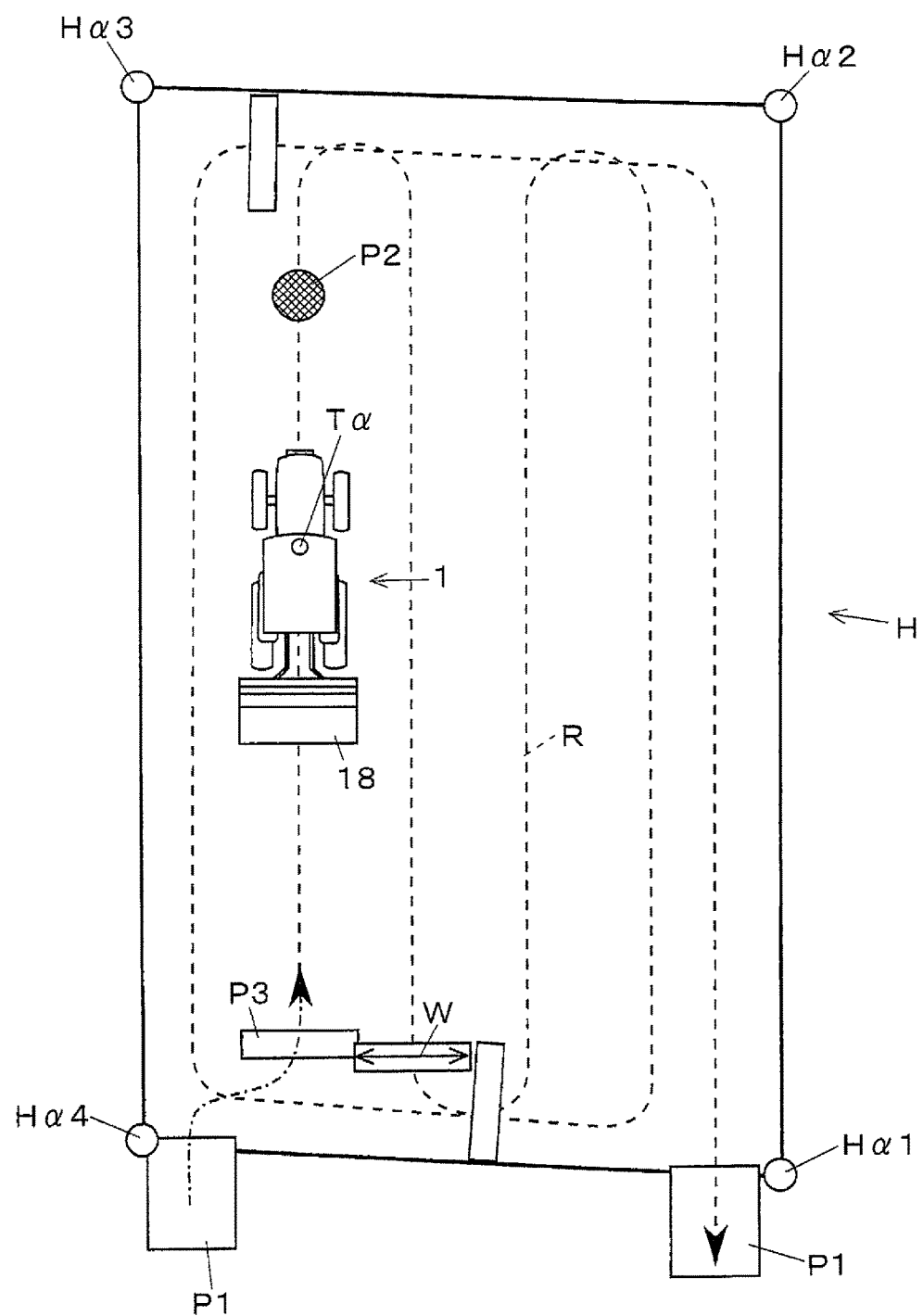
FIG. 10 is a view for illustrating autonomous control of the embodiment.

FIG. 10 is a view for illustrating the autonomous control of this embodiment.

An autonomous control unit CA1 controls the engine E, the steering motor M1, the power transmission device D, and the like on the basis of a positioning position Tα of the tractor 1 positioned by an external GPS, a work guidance path (scheduled path) R, a scheduled traveling speed, the posture change of the tractor, and the like, so as to allow the tractor 1 automatically to travel along a work guidance path R. In addition, the autonomous control unit CA1 of the first embodiment allows the work machine 18, on the basis of the positioning position Tα and a scheduled work position, to work along the work scheduled path R. Incidentally, in FIG. 10, the work guidance path R is preset on the basis of angular positions Hα1, Hα2, Hα3, and Hα4, a position of an input/output path P1, a position of a work origin P3, a vehicle width W, and the like which prescribe the outer shape of the field H.

Herein, the autonomous control unit CA1 of this embodiment detects, on the basis of a captured image by the cameras 311 to 315 and the like, whether an obstacle P2 such as a human or an animal exists in the traveling direction of the tractor 1. In a case where the obstacle P2 is detected, the autonomous control unit CA1 determines to brake the tractor 1. Further, when the obstacle P2 is not detected, it is determined to resume the traveling. In addition, at the time of completing the work, it is determined to brake the tractor 1. Incidentally, a configuration is known commonly which allows the work vehicle such as the tractor 1 to perform a traveling work through the autonomous control on the basis of the work guidance path R and the like. For example, the configuration is described in JP 10-66405 A. Accordingly, the detailed description of the autonomous control unit CA1 is not given.

In a brake flag FL, an initial value is "0". In addition, when the autonomous control unit CA1 determines that the traveling vehicle body 1a is braked, the brake flag L becomes "1". Further, when it is determined that the autonomous control unit CA1 resumes traveling, the brake flag FL becomes "0".

A vehicle speed detection unit CA2 detects the traveling speed V of the traveling vehicle body 1a. In this embodiment, the traveling speed V of the traveling vehicle body 1a is detected on the basis of a detection result of the vehicle speed sensor SN1. Incidentally, the vehicle speed detection unit CA2 detects the traveling speed V on the basis of the detection result of the vehicle speed sensor SN1. However, the detecting method of the traveling speed V is not prescribed thereto. For example, on the basis of the positioning position of the tractor 1 positioned by the external GPS, the traveling speed V may be calculated on the basis of the elapsed time and the time change of the positioning position to be detected, or the traveling speed V may be calculated from a frequency change due to the Doppler effect of the positioning signal received by the external GPS to be detected.

An acceleration detection unit CA3 detects the traveling acceleration A of the traveling vehicle body 1a on the basis of the detection result of the acceleration sensor SN3. Incidentally, in this embodiment, the configuration is exemplified which detects the traveling acceleration A on the basis of the detection result of the acceleration sensor SN3. However, the invention is not limited thereto. For example, on the basis of the time change of the traveling speed V detected by the speed detection unit CA2, the traveling acceleration A may be calculated on the basis of the elapsed time and the time change of the traveling speed V to be detected.

An autonomous brake control unit CA4 as one example of the brake control unit includes a driving clutch control unit CA4a at the time of braking, a brake speed determination unit CA4b, a brake acceleration determination unit CA4c, a clutch control unit CA4d at the time of braking, and a braking device control unit CA4e. The autonomous brake control unit CA4 allows the forward-reverse clutch 48 to move to the block position and the braking device 301 to operate in both right and left directions.

In a case where the traveling vehicle body 1a is braked, the driving clutch control unit CA4a at the time of braking allows the front wheel acceleration clutch 79 to move to a position (four-wheels driving position) connected to the front wheel constant speed gear 82 side. In this embodiment, in a case where the brake flag FL is "1", the driving clutch control unit CA4a at the time of braking energizes the 4WD solenoid 213a and non-energizes (block the energizing) the front wheel acceleration solenoid 213b. Accordingly, the front wheel acceleration clutch 79 is moved to the four-wheels driving position. Incidentally, in FIG. 3, in the power transmission device D of this embodiment, a first transmission system which transmits the power of the engine E to the rear wheel 3 is configured by the shaft or the gear arranged on the rear wheel 3 side from the forward-reverse clutch 48 and arranged on the rear wheel 3 side from the front wheel acceleration clutch 79. In addition, a second transmission system which transmits the power transmitted to the first transmission system to the front wheel 2 is configured by the shaft or the gear arranged on the front wheel 2 side from the front wheel acceleration clutch 79.

In a case where the braking device 301 is operated, the brake speed determination unit CA4b determines, on the basis of the traveling speed V, whether the traveling vehicle body 1a is braked. In this embodiment, whether the traveling speed V is 0 is determined on the basis of the rotation of the rear wheel 3. That is, in a case where it is determined that the rear wheel 3 is stopped, it is determined as the braking.

In a case where the braking device 301 is operated, the brake acceleration determination unit CA4c determines, on the basis of the detection result of the acceleration sensor SN3, whether the traveling vehicle body 1a is braked. In this embodiment, it is determined whether the traveling acceleration A is equal to or more than a magnitude preset in a negative direction. In a case where the traveling acceleration A is equal to or more than the magnitude preset in the negative direction, it is determined that the traveling vehicle body 1a is braked.

The clutch control unit CA4d at the time of braking has an initial control unit CA4d1 and a standby control unit CA4d2. In a case where the traveling vehicle body 1a is braked, the clutch control unit CA4d at the time of braking controls the position of the forward-reverse clutch 48.

In a case where the traveling vehicle body 1a is braked, the initial control unit CA4d1 allows the forward-reverse clutch 48 to move to the block position. In this embodiment, in a case where the brake flag FL is "1", and the front wheel acceleration clutch 79 is in the four-wheels driving position, the advance switching solenoid 141F and the retreat switching solenoid 141R are in a non-energizing state. Accordingly, the forward-reverse clutch 48 is moved to the block position.

In a case where it is determined, on the basis of the determination result of the brake speed determination unit CA4b, that the rear wheel 3 is stopped, the standby control unit CA4d2 allows the forward-reverse clutch 48 to move to a half-clutch position (half-transmission position) set between the transmission position and the block position. In the standby control unit CA4d2 of this embodiment, the advance switching solenoid 141F is energized, and the retreat switching solenoid 141R is non-energized. Further, the standby control unit CA4d2 flows a current, which is preset to be small compared to the case of moving to the transmission position, to the advancing and retreating boosting solenoid 142. Incidentally, alternatively, in the case of the retreat, the advance switching solenoid 141F may be non-energized, and the retreat switching solenoid 141R may be energized.

In a case where the traveling vehicle body 1a is braked, the braking device control unit CA4e operates the right and left braking devices 301. In a case where the brake flag FL is "1", and the forward-reverse clutch 48 is in the block position, the braking device control unit CA4e of this embodiment energizes the right and left solenoids 302L and 302R and flows the initial current preset to the brake pressure solenoid 303. Accordingly, the right and left braking devices 301 are operated in the preset small brake pressure. In addition, after the braking device 301 is operated, in a case where the determination units CA4b and CA4c determines that it is not braked, the braking device control unit CA4e increases the current flowing to the brake pressure solenoid 303 by the preset amount to increase the brake pressure of the braking device 301. Further, the braking device control unit CA4e repeats the increase of the current to increase the brake pressure gradually to a preset upper limit current. Incidentally, in a case where it is detected that the rear wheel 3 is stopped during the increase of the current, the braking device control unit CA4e increases the current to the upper limit current so as to maximize the brake pressure. In addition, in a case where the brake flag FL is "0", the braking device control unit CA4e non-energizes the solenoids 302L and 302R, and 303 and releases the brake of the right and left braking devices 301.

A notification unit CA5 notifies a brake mechanism such as the forward-reverse clutch 48 or the braking device 301, a so-called brake system, of the defect. In the notification unit CA5 of this embodiment, in a case where the determination units CA4b and CA4c determine that it is not braked, and the brake pressure of the braking device 301 is maximized, a sound rings through a buzzer (not illustrated) provided in the tractor 1. In addition, the notification unit CA5 sends a signal which notifies the tablet terminal TAB, the server S3, or the like of an abnormality of the brake system.

Engine Control Unit CB In the engine control unit CB, the output signal is input from signal output elements such as an accelerator operation position detection sensor SN21, an engine rotation sensor SN22, an engine water temperature sensor SN23, the rail pressure sensor E2, and an engine mode selecting switch SW11.

The engine control unit CB is connected to the fuel high-pressure pump E4, the high pressure injectors E6a to E6d, and another control element (not illustrated).

The engine control unit CB has a function to execute the process in response to the output signal and the like from the signal output element and output the control signal to the control element and the like. The engine control unit CB of this embodiment has an engine control unit CB1 at the time of the travel working and an engine control unit CB2 at the time of braking.

The engine control unit CB1 at the time of travel working sets the target common rail pressure in response to the operating condition of the engine E input in the engine mode selecting switch SW1, and feedback-controls the common rail pressure through the pressure control valve E11, such that the common rail pressure detected by the rail pressure sensor E2 matches the target common rail pressure. Incidentally, such a control has been known commonly. Since the control can be applied to the configuration described in JP 2013-24038 A and the like, the detailed description is not given.

In a case where it is determined that the traveling vehicle body 1a is not braked, on the basis of the determination result of the determination units CA4b and CA4c, the engine control unit CB2 at the time of braking stops the engine E. In this embodiment, in a case where the brake pressure of the braking device 301 is maximized, the supply of the fuel from all high pressure injectors E6a to E6d is stopped in a case where it is determined that the traveling vehicle body 1a is not braked. Accordingly, the engine E is stopped.

Work Machine Lifting/Lowering Control Unit CC

In a work machine lifting/lowering control unit CC, the output signal is input from the signal output elements such as a position lever sensor SN31, a lift arm sensor SN32, a draft sensor 33, and a work machine connector CON.

Herein, in this embodiment, the work machine connector CON is configured to correspond to communication standard AG-PORT. In the work machine connector CON, the connector of the work machine such as the rotary tilling device 18 is electrically connected, the control signal is transmitted to the control unit of the work machine, and ID information or the like which identifies the work machine is read from the work machine.

Incidentally, the position lever sensor SN31 detects the operation position of the position lever (not illustrated) which lifts and lowers the lift arms 15 and 15.

The work machine lifting/lowering control unit CC is connected to a work machine lifting solenoid 254a, a work machine lowering solenoid 254b, and another control element (not illustrated).

The work machine lifting/lowering control unit CC has a function to execute the process in response to the output signal from the signal output element, the control units, and the like and to output the control signal to the control element, the control units, and the like. The work machine lifting/lowering control unit CC of this embodiment controls the energizing and non-energizing between the work machine lifting solenoid 254a and the work machine lowering solenoid 254b. Accordingly, the lifting/lowering of the lift arms 15 and 15 are controlled without the supply and discharge of the pressure oil to the hydraulic cylinder 14a.

Control Unit of Tablet Terminal

In FIG. 9, in the terminal control unit CD of the tablet terminal TAB, the output signal is input from a touch panel TAB1, an input button TAB2 such as a power button or a volume change button, and a signal output element such as the control units CA to CC of the tractor 1 or the server S3.

The terminal control unit CD is connected to the touch panel TAB1, a speaker TAB3, and another control element (not illustrated). The terminal control unit CD outputs the control signal to the control elements.

The terminal control unit CD has a function to execute the process in response to the input signal from the signal output element, and to output the control signal to the control elements. The terminal control unit CD of this embodiment has an operating system OS as one example of a basic software, a process software AP1, which is one example of an application software, as one example of a processing unit, and another application software such as internet browser or document preparation software (not illustrated).

In a case where the signal is received by the notification unit CA5, the processing software AP1 of this embodiment displays on the touch panel TAB1 that the defect occurs in the brake system. In addition, in a case where the signal is received by the notification unit CA5, the processing software AP1 rings the speaker TAB3.

Description of Embodiment

Next, the flow of the control in the management system of the work vehicle of the embodiment will be described by using a flow view, a so-called flowchart.

Description of Flowchart of Braking Control Process

Figure 11:
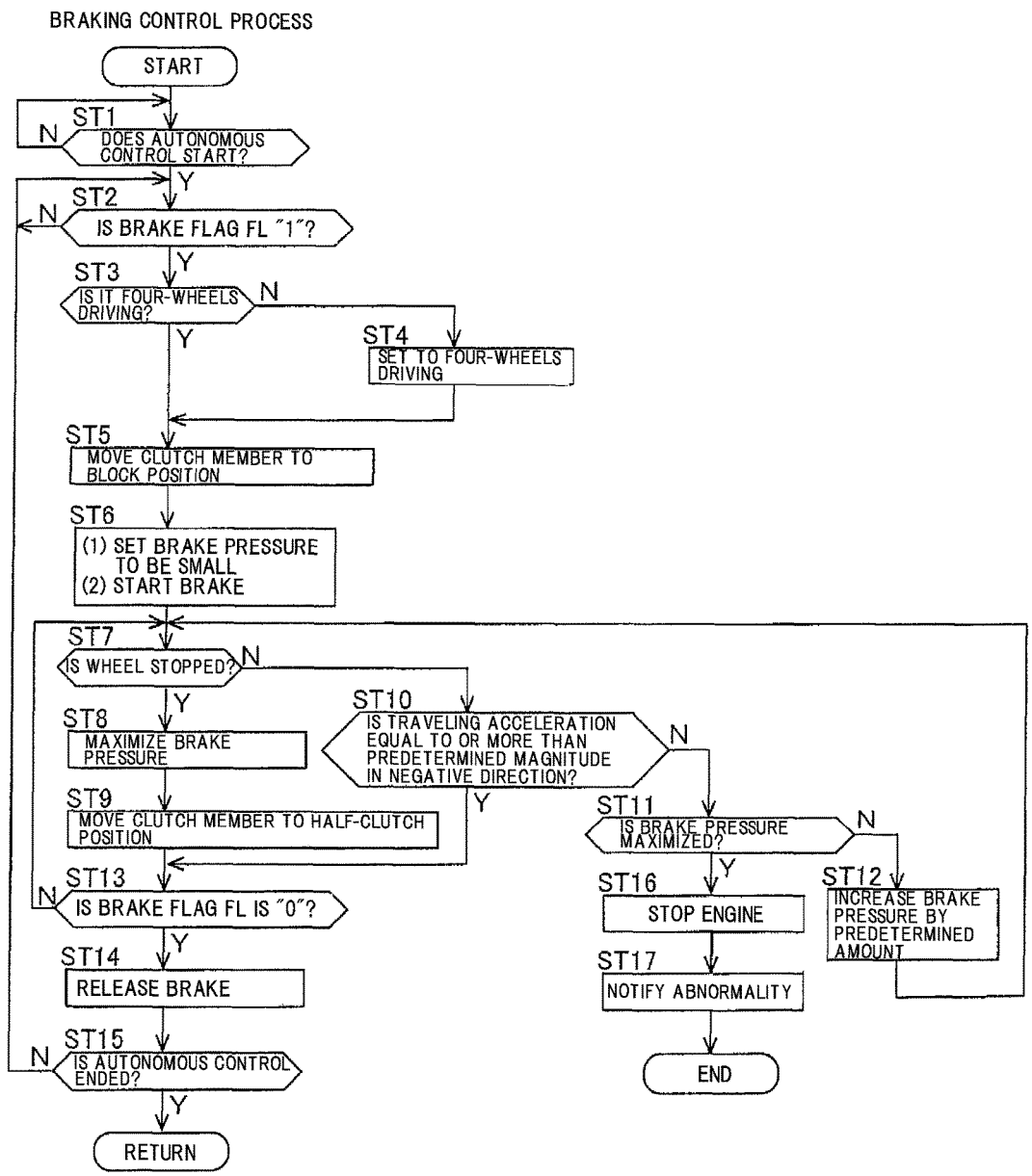
FIG. 11 is a flowchart of a braking control process.

FIG. 11 is a flowchart of the braking control process.

The processes of steps ST of the flowchart of FIG. 11 is executed according to the program stored in the control units CA to CD of the management system S of the work vehicle. In addition, the processes are executed together with other various processes of the management system S of the work vehicle.

The flowchart illustrated in FIG. 11 is started by a key-on operation of the tractor 1.

In ST1 of FIG. 11, the autonomous control determines whether there is an input of the start. In the case of Yes (Y), the procedure proceeds to ST2, and in the case of No (N), ST1 repeats.

In ST2, it is determined whether the autonomous brake is performed, that is, the brake flag FL is "1". In the case of Yes (Y), the procedure proceeds to ST3, and in the case of No (N), ST2 repeats.

In ST3, it is determined whether the front wheel acceleration clutch (drive clutch member) 79 is in the four-wheels driving position. In the case of Yes (Y), the procedure proceeds to ST5, and in the case of No (N), the procedure proceeds to ST4.

In ST4, the front wheel acceleration clutch (drive clutch member) 79 is moved to the four-wheels driving position. Further, the procedure proceeds to ST5.

In ST5, the forward-reverse clutch (clutch member) 48 is moved to the block position. Further, the procedure proceeds to ST6.

In ST6, next (1) and (2) processes are executed. Further, the procedure proceeds to ST7.

(1) The brake pressure is set to be a predetermined small pressure.

(2) The braking device 301 is operated.

In ST7, it is determined whether the traveling speed V is 0, that is, the wheel is stopped. In the case of Yes (Y), the procedure proceeds to ST8, and in the case of No (N), the procedure proceeds to ST10.

In ST8, the brake pressure is maximized. Further, the procedure proceeds to ST9.

In ST9, the forward-reverse clutch (clutch member) 48 is moved to the half-clutch position. Further, the procedure proceeds to ST13.

In ST10, it is determined whether the traveling acceleration A is equal to or more than a predetermined magnitude in the negative direction. In the case of Yes (Y), the procedure proceeds to ST13, and in the case of No (N), the procedure proceeds to ST11.

In ST11, it is determined whether the brake pressure is maximized. In the case of Yes (Y), the procedure proceeds to ST16, and in the case of No (N), the procedure proceeds to ST12.

In ST12, the brake pressure is increased by a predetermined amount. Further, the procedure returns to ST7.

In ST13, it is determined whether the brake flag FL is "0". In the case of Yes (Y), the procedure proceeds to ST14, and in the case of No (N), the procedure returns to ST7.

In ST14, the operation of the braking device 301 is stopped, that is, the brake is released. Further, the procedure proceeds to ST15.

In ST15, it is determined whether the autonomous control is ended. In the case of Yes (Y), the procedure returns to ST1, and in the case of No (N), the procedure returns to ST2.

In ST16, the engine E is stopped. Further, the procedure proceeds to ST17.

In ST17, the abnormality is notified. Further, the braking control process is ended.

In the management system S of the work vehicle of this embodiment including the configuration, as illustrated in FIG. 10, the tractor 1 travels the field along the work guidance path R through the autonomous control. At that time, in a case where the tractor 1 completes the work, the tractor 1 is braked to stop the traveling. In addition, in a case where the obstacle P2 is detected in a traveling direction, and the tractor 1 is braked to stop the traveling. In this embodiment, in a case where the tractor 1 is braked to stop the traveling, the forward-reverse clutch 48 is moved to the block position to operate the right and left braking devices 301. Accordingly, it is blocked that the power is transmitted from the engine E to the wheels 2 to 3, and the wheels 2 to 3 are braked so that the tractor 1 stops on the field.

Herein, in the related art, the control of the braking device is not in conjunction with the control of the engine. That is, although defects occur in the clutch member or the braking device, the engine E is not stopped automatically. Therefore, in the configuration in the related art, in a case where the defect occurs in the brake mechanism (so-called brake system) such as the clutch member or the braking device, there is a risk that the tractor 1 is not braked, and the traveling continues without stopping on the field. Accordingly, there is a risk that the tractor 1 collides with an obstacle and the like, which is problematic. Particularly, in the case of the autonomous control, the tractor 1 is traveled in an unmanned manner in many cases. Accordingly, in the case of the autonomous control, it is difficult for the worker to stop the engine E and the like forcibly in many cases, and a problem such as collision occurs easily.

With respect thereto, in this embodiment, when the brake system is operated, it is determined whether the tractor 1 is braked. Further, in a case where the tractor 1 is not braked, it is determined that the brake system is not operated normally, and the engine E is stopped. Therefore, compared to a case where the engine is not stopped automatically, in this embodiment, the tractor 1 is easily stopped safely although the defect occurs in the brake system.

In addition, in a case where the tractor 1 is braked, even in the two-wheels driving, the switch is performed to the four-wheels driving, and then the brake system is operated. Accordingly, the transmission system of the power of the front wheels 2 and 2 and the transmission system of the power of the rear wheels 3 and 3 are engaged with each other to be movable integrally, and then the rear wheel output shafts 68 and 68 are braked. Therefore, when the rear wheels 3 and 3 are braked by the braking devices 301 and 301, the front wheels 2 and 2 are braked through the transmission system of the power transmission device D. Accordingly, the braking distance is easily shortened compared to a case where only the rear wheels 3 and 3 are braked in the two-wheels driving.

In a case where the tractor 1 is braked, the braking device 301 is operated during the travel stop of the tractor 1. Accordingly, in a case where the field is tilted, it is suppressed that the tractor 1 moves by own weight.

In a case where the rear wheel 3 is stopped, the forward-reverse clutch 48 is moved to the half-clutch position. Accordingly, compared to a case where the forward-reverse clutch is not moved to the half-clutch position, the power can be rapidly transmitted to the wheel at the time of the restarting. In addition, in a case where the brake of the braking device 301 is released in the tilted field and the like, it is suppressed that the tractor 1 moves by own weight conversely to the traveling direction caused by the insufficient torque.

Incidentally, in this embodiment, the brake pressure of the braking device 301 is lifted gradually at the time of braking. Accordingly, in a case where the tractor 1 moves rapidly, a sudden braking and a sudden stop of the tractor 1 are suppressed compared to the configuration which increases the brake pressure at a stroke. Accordingly, in a case where a passenger or an object such as the tablet terminal is in the tractor 1, the impact to the passenger or the object is easily suppressed.

Modification

Hereinbefore, the embodiment of the invention has been described in detail. However, the invention is not limited to the embodiment and may be modified in various ways within the scope of the invention disclosed in the claims. The modification of the invention is exemplified as follows.

A configuration is exemplified in which the forward-reverse clutch 48 is moved to the block position at the time of braking, but the invention is not limited thereto. For example, instead of the forward-reverse clutch 48, the first high and low clutch 24 and the second high and low clutch 25 may be configured to be moved to the block position. In addition, the first synchronizing change 42 and the second synchronizing change 36 may be configured to be moved to the block position.

The configuration is exemplified in which only the forward-reverse clutch 48 is moved as the clutch member which moves to the block position at the time of braking, but the invention is not limited thereto. A configuration can be provided in which the transmission of the power is blocked in a plurality of places in multiple stages, for example, by moving the forward-reverse clutch 48, the first high and low clutch 24, and the second high and low clutch 25 to the block position. Accordingly, the power from the engine E is easily blocked reliably, and the traveling vehicle body 1a is easily stopped safely compared to a configuration in which the transmission of the power is blocked in one place in the power transmission device D.

The configuration is exemplified in which the engine control unit CB2 at the time of braking stops the engine E in response to the process of the traveling control unit CA, but the invention is not limited thereto. A configuration may be provided in which the output signal of the speed sensor SN1 or the acceleration sensor SN3 is directly input to the engine control unit CB, whether the traveling vehicle body 1a is braked is determined only by the engine control unit CB, and the engine E is stopped. Accordingly, even in a case where the defect occurs in one control unit (ECD), the traveling vehicle body 1a is easily braked safely.

The configuration is exemplified in which the autonomous control unit CA1 determines whether the brake is necessary, the engine E is stopped in a case where the defect occurs in the brake system in the case of the autonomous control, but the invention is not limited thereto. For example, the configuration of this embodiment can be applied to the case of a manned operation. For example, in FIG. 11, a configuration may be provided in which the brake flag FL is set to "1" in a case where it is detected by the brake depression sensors SN4a and SN4b that the right and left brakes pedal (not illustrated) is stepped, and the brake flag FL is controlled to "0" in a case where the stepping of the right and left brakes pedal (not illustrated) is released, so that the engine E is automatically stopped in response to the defect of the brake system even in the case of the manned operation.

The configuration is exemplified which controls the right and left braking devices 301 at the same time, but a configuration may be provided which operates only one braking device 301 at the time of turning.

In addition, the configuration of the embodiment may be applied to a work vehicle in which a plurality of wheels are provided, and a crawler is supported between a plurality of wheels.

Incidentally, in the management system S of the work vehicle, a unit which includes the control units CA to CD may be configured to include other control units CA to CD, and a distributed processing and the like may be performed. In addition, a configuration may be provided which transmits the information obtained through the processing in the server S3, the terminal S4, or the like the forward-reverse clutch 48 to the control units CA to CD. Accordingly, for example, a configuration may be provided which performs the process for the autonomous control of the tractor 1 by the server S3 and the like.

What is claimed is:

1. A work vehicle comprising:
   a traveling vehicle body;
   an engine supported by the traveling vehicle body;
   a power transmission device which transmits power of the engine to a wheel, and has a clutch member which is supported to be movable between a transmission position of transmitting the power from the engine and a block position of blocking the transmission of the power from the engine;
   a braking device which brakes the wheel;
   a brake control unit which allows the clutch member to move to the block position and the braking device to operate in a case where the traveling vehicle body is braked;
   a brake determination unit which determine whether the traveling vehicle body is braked in a case where the braking device is operated; and
   an engine control unit which stops the engine in a case where the traveling vehicle body is not braked on the basis of a determination result of the brake determination unit.

2. The work vehicle according to claim 1, further comprising:
   an autonomous control unit which allows the traveling vehicle body to travel autonomously along a preset scheduled path, wherein
   the brake control unit allows the clutch member to move to the block position and the braking device to operate in a case where the autonomous control unit brakes the traveling vehicle body.

3. The work vehicle according to claim 2, wherein the braking device is operated while traveling is stopped.

4. The work vehicle according to claim 1, further comprising:
   wheels on front and rear sides of the traveling vehicle body;
   a first transmission system which transmits the power of the engine to the rear wheel; and
   a second transmission system which transmits the power transmitted to the first transmission system to the front wheel, wherein:
   the clutch member switches transmission and block of the power from the engine to the first transmission system;
   the power transmission device is arranged between the first transmission system and the second transmission system and has a driving switch clutch member which is supported to be movable between a four-wheels driving position of transmitting the power from the first transmission system to the second transmission system and a two-wheels driving position of blocking the transmission of the power from the first transmission system to the second transmission system;
   the braking device brakes the rear wheel; and
   the brake control unit allows the clutch member to move to the block position and the driving switch clutch member to move to the four-wheels driving position in a case where the traveling vehicle body is braked.

5. The work vehicle according to claim 1, further comprising:
   a vehicle speed detection unit which detects a traveling speed of the traveling vehicle body on the basis of a rotation of the wheel braked by the braking device, wherein
   the brake control unit allows the clutch member to move to a half-transmission position set between the transmission position and the block position in a case where the brake determination unit determines on the basis of the traveling speed that the wheel is stopped.

* * * * *